US007288058B2

(12) United States Patent
Kaji et al.

(10) Patent No.: US 7,288,058 B2
(45) Date of Patent: Oct. 30, 2007

(54) SEMI-CONDUCTIVE ROLL

(75) Inventors: Akihiko Kaji, Inazawa (JP); Motoharu Ishihara, Konan (JP); Hirofumi Okuda, Niwa-Gun (JP); Yasuki Ohtake, Susono (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 57 days.

(21) Appl. No.: 10/747,503

(22) Filed: Dec. 29, 2003

(65) Prior Publication Data

US 2004/0152575 A1 Aug. 5, 2004

(30) Foreign Application Priority Data

Jan. 30, 2003 (JP) ............................ 2003-021497

(51) Int. Cl.
*F16C 13/00* (2006.01)
*B21K 1/02* (2006.01)

(52) U.S. Cl. ...................... 492/59; 492/56; 29/895.21; 428/375

(58) Field of Classification Search .................. 492/56, 492/59; 29/895.21; 428/375, 383, 906, 428/35.9, 36.91
See application file for complete search history.

(56) References Cited

U.S. PATENT DOCUMENTS 3,732,096 A * 5/1973 Honjo et al. .................. 430/96
3,885,961 A * 5/1975 Kimura et al. ................ 430/96
4,434,218 A * 2/1984 Tarumi et al. ................ 430/96
4,702,964 A * 10/1987 Hirano et al. ............... 428/447
5,051,313 A * 9/1991 Economy et al. ........... 428/500
5,166,029 A * 11/1992 Bayley et al. ......... 430/108.21
5,244,732 A * 9/1993 Brandon et al. ............ 428/375
5,270,141 A * 12/1993 Ohtani et al. ................. 430/62
5,338,632 A * 8/1994 Hashimoto et al. ...... 430/58.05
5,464,703 A * 11/1995 Ferrar et al. ................ 428/421
5,466,533 A * 11/1995 Fitzgerald et al. .......... 428/447
5,474,852 A * 12/1995 Fitzgerald et al. .......... 428/447
5,500,718 A * 3/1996 Hashimoto et al. ........... 399/46
5,609,554 A * 3/1997 Hayashi et al. ............... 492/56
5,753,154 A * 5/1998 Hayashi et al. ........... 264/45.9
5,804,309 A * 9/1998 Itoh et al. ................... 428/375
5,960,245 A * 9/1999 Chen et al. ................ 399/333
5,998,008 A * 12/1999 Shimamura et al. ........ 428/323
6,017,670 A * 1/2000 Hashizume et al. ..... 430/109.2
6,127,041 A * 10/2000 Szostek et al. ............. 428/450
6,146,320 A * 11/2000 Yoshikawa et al. ........... 492/56
6,168,867 B1 * 1/2001 Davis et al. ................ 428/450
6,175,709 B1 * 1/2001 Takagi et al. ............... 399/279
6,447,904 B1 * 9/2002 Davis et al. ................ 428/379
6,491,613 B2 * 12/2002 Takeda et al. ................ 492/59

(Continued)

FOREIGN PATENT DOCUMENTS

EP 867782 A2 * 9/1998

(Continued)

*Primary Examiner*—Essama Omgba
(74) *Attorney, Agent, or Firm*—Burr & Brown

(57) ABSTRACT

A semi-conductive roll is provided including a shaft, a low-hardness base layer formed on an outer circumferential surface of the shaft, and a coating layer formed by coating the low-hardness base layer radially outwardly. The coating layer includes one of a rubber material and an elastomer material that is crosslinked by at least one resin crosslinking agent.

10 Claims, 1 Drawing Sheet

U.S. PATENT DOCUMENTS

| | | | | |
|---|---|---|---|---|
| 6,523,263 | B2 * | 2/2003 | Jo et al. | 29/895.32 |
| 6,692,422 | B2 * | 2/2004 | Yamaguchi et al. | 492/56 |
| 6,908,419 | B2 * | 6/2005 | Takashima et al. | 492/56 |
| 6,918,866 | B2 * | 7/2005 | Miyamori et al. | 492/56 |
| 6,942,607 | B2 * | 9/2005 | Jo et al. | 492/56 |
| 6,953,421 | B2 * | 10/2005 | Tsunemi et al. | 492/56 |
| 6,954,606 | B2 * | 10/2005 | Barnes et al. | 399/313 |
| 7,008,678 | B2 * | 3/2006 | Chen et al. | 428/36.8 |
| 7,014,899 | B2 * | 3/2006 | Chen et al. | 428/36.8 |
| 2003/0139270 | A1 * | 7/2003 | Jung et al. | 492/56 |
| 2004/0058791 | A1 * | 3/2004 | Takashima et al. | 492/56 |

FOREIGN PATENT DOCUMENTS

| | | | | |
|---|---|---|---|---|
| JP | 01116583 | A | * | 5/1989 |
| JP | 0504841 | A | * | 2/1993 |
| JP | 05045840 | A | * | 2/1993 |
| JP | 07241934 | A | * | 9/1995 |
| JP | 11241719 | A | * | 9/1999 |
| JP | 2000-330372 | A1 | | 11/2000 |
| JP | 2002148933 | A | * | 5/2002 |
| JP | 2004077727 | A | * | 3/2004 |

* cited by examiner

SEMI-CONDUCTIVE ROLL

This application claims the benefit of Japanese Patent Application No. 2003-021497 filed on Jan. 30, 2003, the entirety of which is incorporated herein by reference.

BACKGROUND OF THE INVENTION

1. Field of the Invention

The present invention relates to a semi-conductive roll such as a developing roll, for use in office automation (OA) machines or devices such as electrophotographic copying machines, printers, and telecopiers.

2. Discussion of Related Art

Semi-conductive rolls such as a developing roll and a charging roll are installed on office automation (OA) machines or devices such as electrophotographic copying machines, printers, and telecopiers. For instance, the developing roll is installed such that it is in contact with the toner, so that an electrostatic latent image formed on an outer circumferential surface of a photosensitive drum as an image bearing medium is developed into a visible image. The charging roll is installed on the machines such that the charging roll is rotated while it is held in contact with the photosensitive drum. Thus, the semi-conductive rolls perform respective functions.

Described more specifically, the developing roll carries a layer of toner on its outer circumferential surface. The developing roll and the photosensitive drum are rotated while the developing roll is held in contact with the photosensitive drum on which the latent image is formed, so that the latent image is developed into a toner image. The charging roll and the photosensitive drum are rotated such that the charging roll to which a voltage is applied is held in pressing contact with the outer circumferential surface of the photosensitive drum, to thereby charge the outer circumferential surface of the photosensitive drum.

Such semi-conductive rolls described above include a suitable shaft (metal core) as an electrically conductive body and an electrically conductive base layer with a suitable thickness formed on an outer circumferential surface of the shaft and constituted by a solid elastic body, a foamed elastic body or the like. The semi-conductive rolls further include, as needed, an intermediate layer and a surface layer in the form of a resistance adjusting layer and a protective layer formed radially outwardly of the base layer, for the purpose of adjusting the electric resistance of the roll and protecting the base layer having a relatively low hardness.

In recent years, there have been increasing demands for high image quality and energy saving (reduction of electric power consumption) in the office automation (OA) machines or devices such as the copying machines, printers, and telecopiers. To meet such demands, in place of a conventionally employed crushed toner, there is employed spherical polymeric toner having a relatively small particle size and particle size difference and a low melting point, so that the toner particles can be uniformly charged.

Where a pressure of contact between the semi-conductive roll and the photosensitive drum is relatively large, the polymeric toner having a lowered melting point tends to be broken or deformed by softening, and the particles of the toner tend to aggregate, making it difficult to attain the intended high image quality and energy saving. In view of this, the semi-conductive roll needs to be arranged so as to assure careful handling of the toner to prevent a large stress acting on the toner. To this end, the hardness of the base layer which influences the hardness of the roll is lowered. Further, the intermediate layer and the surface layer are formed of a soft rubber material or an elastomer material in view of a fact that the roll tends to suffer from creases or wrinkles if a difference between the hardness of the base layer and the hardness of the intermediate or surface layer formed radially outwardly of the base layer increases.

Where the intermediate layer or the surface layer is formed by using the rubber material or the elastomer material according to a known coating method such as dipping or roll coating on the low-hardness base layer, in particular on the low-hardness base layer constituted by a solid elastic body, the intermediate layer or the surface layer serving as the coating layer does not have a sufficient crosslinking density, so that the roll may not exhibit a wear resistance high enough to withstand a long period of use. In addition, the coating layers of individual rolls have different thickness values due to a progress of scorching of the rubber component in the coating liquid. In this case, the rolls do not have an intended surface condition required to attain the high image quality. If the amount of the crosslinking agent to be added to the coating liquid is decreased in order to permit the coating liquid to be stored at room temperature with high stability without suffering from the scorching, the crosslinking or vulcanization does not proceed, undesirably increasing a time period required for the vulcanization and deteriorating the production efficiency. In addition, the crosslinking density of the coating layer is undesirably lowered.

In general, since the amount of the coating liquid to be prepared for the coating operation for forming the intermediate layer or the surface layer is larger than that actually used in the coating operation, a part of the coating liquid is inevitably left unused. The unused coating liquid is recovered and recycled in view of the cost. In the recycling process, the scorching of the rubber component in the coating liquid progresses, so that the coating liquid tends to be gelled, producing agglomerates. If the coating liquid which includes the agglomerates is coated on the outer surface of the base layer, the roll undesirably suffers from surface defects, increasing the reject ratio.

Conventionally, the surface of the semi-conductive roll, in particular the surface of the developing roll is slightly roughened for improving its toner transferring property. For instance, the surface of the base layer is suitably roughened by grinding or molding, so that the roll has a desired surface roughness. Alternatively, as disclosed in JP-A-2000-330372, a roughening agent such as a spherical filler is added to the coating layer (serving as the intermediate layer or the surface layer), so that the roll has a desired surface roughness. Owing to the use of the polymeric toner described above, the uniform charging of the toner is realized for attaining high image quality. To attain further improved image quality, it is required to precisely control the surface roughness of the roll. Where the intermediate layer or the surface layer of the roll is formed by the coating operation, however, the coating layers of individual rolls undesirably have different thickness values, making it quite difficult to control the surface roughness as desired.

SUMMARY OF THE INVENTION

The present invention was made in view of the background art described above. It is therefore a first object of this invention to provide a semi-conductive roll including a coating layer formed by coating radially outwardly of a low-hardness base layer, which semi-conductive roll exhibits a wear resistance high enough to withstand a long period of use by improving the crosslinking density of the coating layer and which has a desired surface condition with high accuracy owing to ease of control of the thickness of the coating layer.

It is a second object of the invention to provide a semi-conductive roll which is produced with high economy and high efficiency, without suffering from defects on its surface due to agglomerates which arise from gelation of the coating liquid for forming the coating layer, even if the coating liquid is recycled.

In an attempt to achieve the objects indicated above, the inventors of the present invention made an extensive study and found that, in sulfur crosslinking (sulfur vulcanization) conventionally conducted for crosslinking (vulcanizing) the coating layer, the crosslinking density of the coating layer is deteriorated for the following reasons: The sulfur as the crosslinking agent (vulcanizing agent) migrates or transfers to the low-hardness base layer by heating. Further, the inhibitory component of the base layer which inhibits the crosslinking of the coating layer transfers to the coating layer. The inventors further found the following: In the coating liquid which contains the sulfur crosslinking agent, the scorching progresses at room temperature with a lapse of time, increasing the viscosity of the coating liquid. If the viscosity of the coating liquid is adjusted, by using a solvent, to an intended value suitable for the coating method to be employed, the amount of the solid component in the coating liquid is undesirably changed due to the addition of the solvent, making it difficult to control the thickness of the coating layer. The inventors found that the coating layer has a high crosslinking density if the coating layer is formed by resin crosslinking in which the rubber or elastomer material is crosslinked by a resin material used as a crosslinking agent, in place of the conventional sulfur crosslinking. The semi-conductive roll whose coating layer has a high crosslinking density described above exhibits an improved resistance to wear. In addition, since the coating liquid which includes the resin crosslinking agent does not suffer from an increase in its viscosity due to the scorching of the rubber or elastomer material included in the coating liquid, which scorching takes place at room temperature, there is no need to adjust the viscosity by addition of the solvent, so that the amount of the solid component contained in the coating liquid is kept constant, making it possible to easily control the thickness of the coating layer.

The present invention has been developed based on the above-described findings, and the objects indicated above may be achieved according to the principle of the present invention, which provides a semi-conductive roll including a shaft, a low-hardness base layer formed on an outer circumferential surface of the shaft, and a coating layer formed by coating radially outwardly of the low-hardness base layer, wherein the coating layer is formed such that a rubber material or an elastomer material is crosslinked by at least one resin crosslinking agent.

In the present semi-conductive roll constructed as described above wherein the coating layer is formed by using the resin crosslinking agent in place of the conventionally used sulfur crosslinking agent, the resin crosslinking agent is effectively prevented from migrating or transferring to the low-hardness base layer, for thereby improving the crosslinking density of the coating layer. Therefore, the present semi-conductive roll is advantageously given a wear resistance high enough to withstand a long period of use.

In the present semi-conductive roll, the coating liquid for forming the coating layer includes the resin crosslinking agent. The coating liquid which includes the resin crosslinking agent does not suffer from an increase in its viscosity due to the scorching of the rubber or elastomer material included therein, which scorching takes place at room temperature, so that the viscosity suitably adjusted to a desired value depending upon the coating method to be employed is kept unchanged. Accordingly, there is no need to adjust the viscosity by addition of the solvent, so that the amount of the solid component, i.e., the rubber or elastomer component in the coating liquid is kept constant, whereby the thickness of the coating layer can be easily controlled, permitting the semi-conductive roll to have a desired surface condition with high accuracy.

In the coating liquid which contains the resin crosslinking agent, the scorching of the rubber or elastomer material is prevented and the gelation or agglomeration of the coating liquid is not likely to occur. Accordingly, even if the coating liquid is recycled or reused, the semi-conductive roll does not suffer from undesirable surface defects due to the gelation or agglomeration of the coating liquid. Thus, the present semi-conductive roll enjoys high economy and high production efficiency.

In one preferred form of the semi-conductive roll according to the present invention, the at least one resin crosslinking agent has an aromatic ring structure or a heterocyclic structure. It is particularly preferable to employ, as the resin crosslinking agent, phenol-formaldehyde resin of resol type or xylene-formaldehyde resin of resol type. The resin crosslinking agent having such an aromatic ring structure or a heterocyclic structure is advantageously prevented from migrating or transferring to the low-hardness base layer, whereby the coating layer has the intended high crosslinking density.

In another preferred form of the semi-conductive roll according to the present invention, the at least one resin crosslinking agent is included in an amount of 1-60 parts by weight per 100 parts by weight of a total amount of the resin crosslinking agent and the rubber material or the elastomer material.

As the rubber material, it is preferable to employ acrylonitrile-butadiene rubber (NBR) whose acrylonitrile content is not less than 30%.

The low-hardness base layer is preferably constituted by a solid elastic body. The coating layer formed radially outwardly of the low-hardness base layer constituted by the solid elastic body enjoys the advantages of the present invention described above, in view of the fact that the sulfur crosslinking agent tends to migrate or transfer more easily to the base layer constituted by the solid elastic body than base layers formed of any other materials.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which:

FIGS. 2A-2D are fragmentary enlarged views of the semi-conductive rolls constructed according to other embodiments of the invention, wherein FIGS. 2A and 2B show respective semi-conductive rolls each of which has a two-layered structure consisting of a low-hardness base layer and a surface layer while FIGS. 2C and 2D show respective semi-conductive rolls each of which has a three-layered structure consisting of a low-hardness base layer, an intermediate layer, and a surface layer.

DETAILED DESCRIPTION OF THE INVENTION

Figure 1:
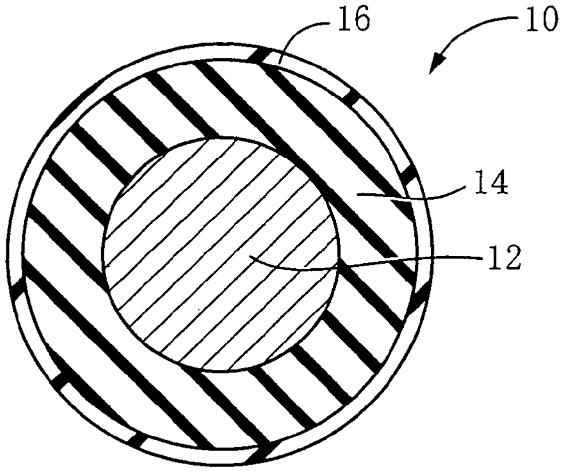
FIG. 1 is a cross-sectional view of a semi-conductive roll constructed to one embodiment of the present invention.

Referring first to the transverse cross-sectional view of FIG. 1, there is shown one representative example of a roll structure employed in a semi-conductive roll according to the present invention. The semi-conductive roll generally indicated at 10 in FIG. 1 includes a bar- or pipe-shaped electrically conductive shaft 12 (metal core) formed of metal such as stainless steel. On an outer circumferential surface of the shaft 12, there is provided an electrically conductive, low-hardness base layer 14 having a suitable thickness and constituted by a solid elastic body or a foamed elastic body each having a relatively low hardness. Further, a surface layer in the form of a coating layer 16 having a suitable thickness is formed radially outwardly of the low-hardness base layer 14 by coating such as roll coating or dipping.

The present invention is characterized in that the coating layer 16 formed radially outwardly of the low-hardness base layer 14 is formed by resin crosslinking wherein the rubber or elastomer material is crosslinked by at least one resin crosslinking agent as described below, in place of the conventionally employed sulfur crosslinking in which the sulfur material is used as a crosslinking agent.

In the semi-conductive roll 10 constructed according to the present invention, the low-hardness base layer 14 is formed on the outer circumferential surface of the shaft 12 by using known conductive elastic materials which give a solid structure, or conductive foamable materials, so that the low-hardness base layer 14 has a low degree of hardness or a high degree of softness corresponding to JIS-A hardness of about 5°-50° required by the semi-conductive roll.

Examples of the elastic material which gives the low-hardness base layer 14 include known rubber elastic mateials such as ethylene-propylene-diene rubber (EPDM), styrene-butadiene rubber (SBR), natural rubber (NR), acrylonitrile-butadiene rubber (NBR), silicone rubber, and polynorbornene rubber, and known elastomer materials such as polyurethane. By using at least one of the rubber elastic materials or at least one of the elastomer materials described above, the low-hardness base layer 14 constituted by an elastic body having a relatively low hardness is formed integrally on the shaft 12 in a manner known in the art. As known in the art, a suitable adhesive agent is used as needed for forming the base layer 14 integrally on the shaft 12. The base layer 14 may be constituted by the solid elastic body formed by using the rubber elastic materials or the elastomer materials described above. Alternatively, the base layer 14 may be constituted by a foamed elastic body formed by using foamable rubber materials or foamable urethane materials. As the foamable materials which give the foamed elastic body, any known foamble materials may be employed, provided that the semi-conductive roll to be obtained exhibits the characteristics required by the roll without suffering from permanent set, etc. For instance, a rubber material such as acrylonitrile-butadiene rubber (NBR), hydrogenated NBR (H-NBR), polyurethane rubber, EPDM, or silicone rubber is foamed by a known foaming agent such as azodicarbonamide, 4,4'-oxybisbenzene-sulfonyl hydrazide, dinitroso pentamethylene tetramine or $NaHCO_3$, for thereby providing the base layer constituted by the foamed elastic body.

To the above-described material for the base layer 14, at least one electrically conductive agent is added, so that the base layer 14 is given the required conductivity, and the volume resistivity of the base layer 14 is adjusted to a desired value. Examples of the conductive agent include carbon black, graphite, potassium titanate, iron oxide, c-$TiO_2$, c-ZnO, c-$SnO_2$, and an ion-conductive agent such as quaternary ammonium salt, borate, or a surfactant. Where the base layer 14 of the solid structure is formed by using the elastic material such as the rubber elastic material, a large amount of softening agent such as a process oil or a liquid polymer is added to the elastic material, so that the base layer 14 has a low degree of hardness and a high degree of softness.

Where the low-hardness base layer 14 is formed of the conductive elastic material, the base layer 14 has a volume resistivity generally in a range from about $1\times10^3$ Ω·cm to about $1\times10^{12}$ Ω·cm and has a thickness generally in a range of about 0.1-10 mm, preferably in a range of about 2-4 mm. Where the low-hardness base layer 14 is formed of the conductive foamable material, the base layer 14 has a volume resistivity generally in a range from about $1\times10^3$ Ω·cm to about $1\times10^{12}$ Ω·cm and has a thickness generally in a range of about 0.5-10 mm, preferably in a range of about 3-6 mm.

In the present semi-conductive roll shown in FIG. 1, the coating layer 16 is formed radially outwardly of the low-hardness base layer 14 described above, whereby the toner is effectively prevented from adhering to or accumulating on the surface of the roll. The coating layer 16 of the semi-conductive roll according to the present invention is formed such that the rubber material or the elastomer material is crosslinked by at least one resin crosslinking agent described below. According to the present arrangement, the crosslinking agent present in the coating layer 16 is effectively prevented from transferring or migrating to the base layer 14, whereby the coating layer 16 has a sufficiently high crosslinking density. Therefore, the semi-conductive roll 10 is given an excellent wear resistance.

The rubber material or the elastomer material for the coating layer 16 is selected from among known rubber materials and elastomer materials which are conventionally used for forming the coating layer and which are soluble to solvents. At least one of the rubber materials or at least one of the elastomer materials may be suitably selected. Examples of the rubber materials include NR, isoprene rubber (IR), butadiene rubber (BR), SBR, NBR, H-NBR, EPDM, ethylene-propylene rubber, butyl rubber, acrylic rubber, polyurethane rubber, chloroprene rubber, chlorinated polyethylene rubber, chlorosulfonated polyethylene rubber, and epichlorohydrin rubber. Examples of the elastomer material include thermoplastic poly-urethane elastomer and poly-amide elastomer. Among those described above, it is preferable to use NR, IR, BR, SBR, and NBR since the coating layer 16 formed by using those rubber materials noticeably exhibits the above-described effects of the present invention. It is particularly preferable to use NBR whose acrylonitrile (AN) content is not less than 30%. By using the NBR described above, the volume resistivity can be easily adjusted to a value generally rquired by the surface of the semi-conductive roll (i.e., about $1\times10^5$–$1\times10^{12}$ Ω·cm). Further, the above-described NBR is excellent in terms of crosslinking with respect to the resin crossliking agent such as phenol-formaldehyde resin described below, and blending property or solubility with respect to such a resin crosslinking agent.

By using the rubber material or the elastomer material described above, there is prepared a coating liquid for forming the coating layer 16. To the rubber material or the elastomer material, at least one known resin crosslinking agent is added for crosslinking the rubber material or the elastomer material. Thus, the present invention employs a resin crosslinking method wherein the rubber material or the elastomer material is crosslinked by the resin crosslinking agent which assures high stability of the coating liquid at room temperature.

The resin crosslinking agent to be used is not particularly limited, and may be suitably selected from among known resin crosslinking agents. Examples of the resin crosslinking agent include thermosetting resins such as phenol-formaldehyde resin, xylene-formaldehyde resin, amino resin, guanamine resin, unsaturated polyester resin, diallyl phthalate resin, epoxy resin, phenoxy resin, and urethane resin. More specifically described, examples of the amino resin include melamine resin type crosslinking agents such as completely alkyl-methylated melamine resin, methylol group-methylated melamine resin, imino group-inethylated melamine resin, completely alkyl-mixed etherified melamine resin, methylol group-mixed etherified melamine resin, imino group-mixed etherified melamine resin, and high-solid-butylated melamine resin. Examples of the epoxy resin include epoxy resin type crosslinking agents such as Bisphenol-A glycidyl ether epoxy resin, Bisphenol glycidyl ether epoxy resin, novolak glycidyl ether epoxy resin, polyethylene glycol glycidyl ether epoxy resin, polypropylene glycol glycidyl ether epoxy resin, glycerin glycidyl ether epoxy resin, aromatic glycidyl ether epoxy resin, aromatic glycidyl amine epoxy resin, phenol glycidyl amine epoxy resin, hydrophthalic acid glycidyl ester epoxy resin, and dimmer acid glycidyl ester epoxy resin. Examples of the urethane resin include polyisocyante(s) such as tolylene diisocyanate, diphenyl methane diisocyanate, hexamethylene diisocyante, and isophorone diisocyanate; biuret type, isocyanurate type, and trimethylol propane modified type of those isocyanates; and blocked type thereof. In addition to the resin crosslinking agents described above, there may be suitably employed modified materials of the resin crosslinking agents, high-solid benzoguanamine resin, glycol uryl resin, carboxy modified amino resin.

Among various known resin crosslinking agents described above, it is preferable to use a resin crosslinking agent having an aromatic ring structure or a heterocyclic structure. In particular, phenol-formaldehyde resin of resol type or xylene-formaldehyde resin of resol type is preferably used. These resol type resins are prepolymers obtained by addition-condensation reaction of phenol or xylene and formaldehyde with and alkali catalyst. The inventors of the present invention speculate that the resin crosslinkging agent having the aromatic ring structure or heterocyclic structure, in particular, the phenol-formaldehyde resin of resol type or xylene-formaldehyde resin of resol type is effectively prevented from transferring or permeating into the low-hardness base layer 14 owing to the molecule structure or molecule size, so that the coating layer 16 has a desired crosslinking density. However, the mechanism is not clear.

The amount of the resin crosslinking agent is suitably determined depending upon the desired degree of flexibility or softness. The amount of the resin crosslinking agent is held in a range of 1-60 parts by weight, preferably 10-50 parts by weight per 100 parts by weight of the total amount of the resin croslinking agent and the rubber material or the elastomer material. In other words, the ratio of the resin crosslinking agent to the rubber material or the elastomer material (the resin crosslinking agent: the rubber material or the elastomer material) is selected within a range of 1:99-60:40, preferably within a range of 10:90-50:50. If the amount of the resin crosslinking agent is excessively small, the crosslinking or vulcanization of the coating layer 16 does not sufficiently proceed. In this case, the time period required for the crosslinking is undesirably increased, deteriorating the production efficiency. In addition, the coating layer 16 is not sufficiently crosslinked, resulting in an insufficient resistance to wear. If the amount of the resin crosslinking agent is excessively large, on the other hand, the hardness of the coating layer 16 is excessively increased, so that the semi-conductive roll may undesirably suffer from various problems such as insufficient flexibility or softness and creases or wrinkles.

To permit the semi-conductive roll 10 to have various physical properties such as semi-conductivity and softness required by the roll 10, the material for the coating layer 16 further includes, as needed, at least one conducive agent, at least one filler, at least one softener, and various additives in respective suitable amounts, in addition to the rubber material or the elastomer material and the resin crosslinking agent described above. Examples of the conductive agent include carbon black, graphite, potassium titanate, iron oxide, c-$TiO_2$, c-ZnO, c-$SnO_2$, ion conductive agents such as quaternary ammonium salt, borate, a surfactant. Where the semi-conductive roll 10 is produced as a developing roll, there may be included, as needed, a roughening agent such as a filler having a suitable shape and size for permitting the surface of the roll to be roughened as desired, so that the developing roll has an intended toner transferring property.

The material for the coating layer 16 in which various components described above are mixed is dissolved in a solvent in a known manner so as to provide a coating liquid having an intended viscosity. Any known solvents may be employed for preparing the coating liquid which includes the rubber material or the elastomer material, the resin crosslinking agent and the additives, as long as the rubber material or the elastomer material are dissolved in solvents. For instance, there may be employed organic solvents such as acetone, methyl ethyl ketone, methanol, isopropyl alcohol, methyl cellosolve, toluene, and dimethyl formamide. At least one of, or any combination of those solvents may be used. While the viscosity of the coating liquid is suitably adjusted depending upon the coating method to be employed, the viscosity is generally held in a range of about 5-1000 mPa s.

The thus prepared coating liquid wherein the resin crosslinking agent is included for crosslinking the rubber material or the elastomer material is not likely to suffer from the scorching of the rubber material or the elastomer material at room temperature, so that the coating liquid is less likely to suffer from a change in its viscosity. Accordingly, the viscosity of the coating liquid is kept at a desired value suitable for the coating method employed for forming the coating layer 16, whereby the thickness of the coating layer 16 can be easily controlled to a desired value with high stability and the semi-conductive roll 10 has a desired surface condition with considerably high accuracy.

In the coating liquid prepared as described above, the scorching of the rubber material or the elastomer material contained therein does not take place at room temperature, so that the coating liquid is not likely to suffer from gelation and enjoys a much longer life than conventional coating liquids. Accordingly, even where the coating liquid is repeatedly used for forming the coating layer 16, the semi-conductive roll 10 is advantageously prevented from suffering from surface defects and deterioration of appearance which arise from agglomerates due to the gelation of the coating liquid. Thus, the semi-conductive roll 10 can be produced with high economy and high efficiency. The coating liquid prepared as described above can be repeatedly used, so that the present coating liquid is highly economical and friendly to environment.

The coating liquid prepared as described above is coated on the low-hardness base layer 14, so that the coating layer 16 is laminated on the base layer 14, thereby providing the intended semi-conductive roll 10.

The coating layer 16 formed as described above generally has a volume resistivity of about $1\times10^3$–$1\times10^{12}$ Ω·cm and a thickness of about 1-200 μm.

In producing the semi-conductive roll shown in FIG. 1, various known methods may be employed. For instance, by using the material for the low-hardness base layer, the base layer 14 is formed, on the outer circumferential surface of the shaft 12 coated with an adhesive agent, by known methods such as extrusion and molding by using a metal mold. On the outer circumferential surface of the thus formed low-hardness base layer 14, the coating layer 16 is formed by coating so as to have a suitable thickness. Thus, the intended semi-conductive roll is obtained. In the present invention, various known coating methods such as dipping, roll coating, and spray coating may be employed. The coating liquid which covers the low-hardness base layer 14 is subjected to a heat treatment under ordinary conditions (e.g., at 120-200° C. for 10-120 minutes), so that the solvent is removed and the rubber material or the elastomer material is crosslinked, for thereby providing the coating layer 16 having the desired flexibility or softness.

The thus constructed semi-conductive roll 10 wherein the low-hardness base layer 14 and the coating layer 16 are formed in the order of description on the shaft 12 exhibits a low degree of hardness or a high degree of softness and good conductivity owing to the low-hardness base layer 14. Further, the toner is effectively prevented from adhering to or accumulating on the surface of the roll owing to the coating layer 16. In addition, the semi-conductive roll 10 exhibits an excellent wear resistance and the desired surface condition with high accuracy.

The semi-conductive roll 10 according to the present invention is advantageously used in the form of the developing roll, charging roll, transfer roll, etc., for the office automation (OA) machines or devices such as the electrophotographic copying machines, printers, and telecopiers.

While the presently preferred embodiment of this invention has been described in detail by reference to the drawing, it is to be understood that the invention may be otherwise embodied.

The semi-conductive roll 10 shown in FIG. 1 has a two-layered structure consisting of the low-hardness base layer 14 and the coating layer 16 formed as the surface layer on the outer circumferential surface of the base layer 14. The structure of the semi-conductive roll is not limited to that shown in FIG. 1, provided that the semi-conductive roll at least includes the coating layer formed by coating radially outwardly of the low-hardness base layer 14. For instance, the semi-conductive roll may have a three-layered structure consisting of the low-hardness base layer 14, the surface layer (16), and one intermediate layer interposed therebetween, or a multi-layered structure consisting of the low-hardness base layer 14, the surface layer (16), and at least two intermediate layers interposed therebetween. The intermediate layer/layers is/are formed by various methods such as coating and extrusion molding. In forming the intermediate layer/layers by coating, there may be employed the sulfur crosslinking method or the resin crosslinking method.

Figure 2A:
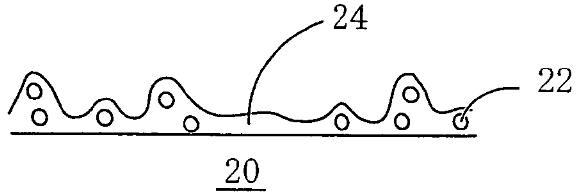
Figure 2B:
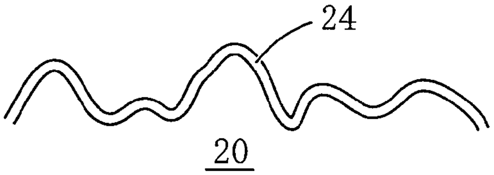
Figure 2C:
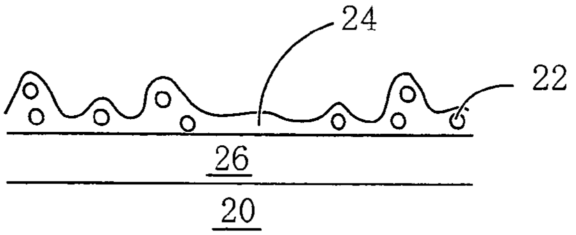
Figure 2D:
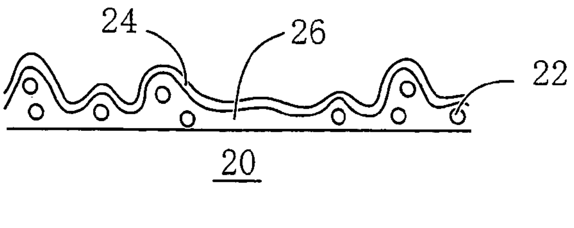

The surface of the developing roll as one example of the semi-conductive roll is suitably roughened, so that the developing roll exhibits improved toner transferring property. For instance, a coating layer (serving as a surface layer 24) in which a roughening agent 22 having a predetermined particle size is contained may be formed on the outer circumferential surface of a low-hardness base layer 20, as shown in FIG. 2A. As shown in FIG. 2B, on the outer circumferential surface of the low-hardness base layer 20 which is suitably roughened by grinding or molding, a coating layer (serving as the surface layer 24) may be formed to have a suitable thickness. Where the semi-conductive roll has the three-layered structure consisting of the low-hardness base layer, intermediate layer, and surface layer, an intermediate layer 26 having a suitable thickness is formed on the outer circumferential surface of the low-hardness base layer 20, and a coating layer (serving as the surface layer 24) in which the roughening agent 22 is contained is formed on the outer circumferential surface of the intermediate layer 26, as shown in FIG. 2C. As shown in FIG. 2D, a coating layer (serving as the intermediate layer 26) in which the roughening agent 22 is contained is formed on the outer circumferential surface of the low-hardness base layer 20, and a coating layer (serving as the surface layer 24) having a suitable thickness is formed on the outer circumferential surface of the intermediate layer 26. Even where the surface of the roll is roughened as described above shown in FIGS. 2A-2D, the variation of the thickness of the coating layer can be minimized according to the present invention, whereby the roll has precisely controlled desired surface roughness with considerably high accuracy. In the developing roll having the three-layered structure consisting of the low-hardness base layer, intermediate layer, and surface layer, the thickness values of the low-hardness base layer, intermediate layer, and surface layer are preferably held in a range of 0.1-10 mm, in a range of 1-200 μm (preferably in a range of 5-50 μm), and in a range of 1-200 μm (preferably in range of 5-50 μm), respectively.

It is to be understood that the present invention may be embodied with various changes, modifications and improvements that may occur to those skilled in the art, without departing from a scope of the invention defined in attached claims.

EXAMPLES

To further clarify the present invention, some examples of the present invention will be described. It is to be understood that the present invention is not limited to the details of these examples and the foregoing description.

To obtain the semi-conductive roll having the structure shown in FIG. 1, electrically conductive silicone rubber (X34-264 A/B, available from Shin-etsu Chemicals, Co., Ltd, Japan) was prepared as the material for the low-hardness base layer (14) while thirteen kinds of materials for forming respective coating layers (16) were prepared so as to have respective compositions as indicated in the following TABLE 1-3 (i.e., Examples A through M). Each of those materials for the coating layers was dissolved in methyl ethyl ketone, for thereby providing respective coating liquids each having a predetermined viscosity (about 10 mPa·s).

TABLE 1

| | | | | Examples | | | | |
|---|---|---|---|---|---|---|---|---|
| | | | | A | B | C | D | E |
| Contents [parts by weight] | NBR (AN content 41%) | N220SH | JSR CORPORATION, Japan | 70 | 70 | — | — | 55 |
| | NBR (AN content 34%) | N231H | JSR CORPORATION, Japan | — | — | 40 | — | — |
| | NBR (AN content 50%) | NIPOL DN009 | ZEON Corporation, Japan | — | — | — | 90 | — |
| | Phenol-formaldehyde resin of novolak type | SUMILITERESIN PR-13355 | SUMITOMO DULLES CO., LTD., Japan | 30 | — | — | — | — |
| | Phenol-formaldehyde resin of resol type | SUMILITERESIN PR-175 | SUMITOMO DULLES CO., LTD., Japan | — | 30 | — | — | — |
| | Phenol-formaldehyde resin of resol type | SHONOL CKS-380A | SHOWA HIGHPOLYMER CO., LTD., Japan | — | — | 60 | — | — |
| | Phenol-formaldehyde resin of resol type | SHONOL BKM-2620 | SHOWA HIGHPOLYMER CO., LTD., Japan | — | — | — | 10 | — |
| | Xylene-formaldehyde resin of resol type | NIKANOL PR-1440 | MITSUBISHI GAS CHEMICAL COMPANY, INC., Japan | — | — | — | — | 45 |
| | Carbon black | DENKA BLACK | DENKI KAGAKU KOGYO KABUSHIKI KAISHA, Japan | 30 | 30 | 30 | 30 | 30 |
| | Crosslinking conditions | Temperature [° C.] | | 160 | 160 | 160 | 160 | 160 |
| | | Time [hour] | | 1 | 1 | 1 | 1 | 1 |

TABLE 2

| | | | | Examples | | | | |
|---|---|---|---|---|---|---|---|---|
| | | | | F | G | H | I | J |
| Contents [parts by weight] | NBR (AN content 41%) | N220SH | JSR CORPORATION, Japan | — | — | 70 | 80 | — |
| | Carboxyl group-containing NBR | NIPOL 1072J | ZEON Corporation, Japan | 70 | 80 | — | — | — |
| | Urethane rubber | UN278 | SAKAI CHEMICAL INDUSTRIAL, CO., LTD., Japan | — | — | — | — | 70 |
| | PVB | DENKA BUTYRAL 4000-2 | DENKI KAGAKU KOGYO KABUSHIKI KAISHA, Japan | — | — | — | — | 30 |
| | Phenol-formaldehyde resin of resol type | SUMILITERESIN PR-175 | SUMITOMO DULLES CO., LTD., Japan | — | — | 30 | — | — |
| | Xylene-formaldehyde resin of resol type | NIKANOL PR-1440 | MITSUBISHI GAS CHEMICAL COMPANY, INC., Japan | — | — | — | 20 | — |
| | Epoxy resin | DENACOL EX-622 | Nagase ChemteX Corporation, Japan | — | 20 | — | — | — |
| | Butylated melamine resin | SUPERBECKAMINE J-820-60 | DAINIPPON INK AND CHEMICALS, INCORPORATED, Japan | 30 | — | — | — | — |
| | Blocked HDI | BURNOCK D-550 | DAINIPPON INK AND CHEMICALS, INCORPORATED, Japan | — | — | — | — | 10 |
| | Carbon black | DENKA BLACK | DENKI KAGAKU KOGYO KABUSHIKI KAISHA, Japan | 30 | 30 | 30 | 30 | 30 |
| | Roughening agent | MX-1500 | SOKEN CHEMICALS, CO., LTD., Japan | — | — | 10 | 10 | 10 |
| | Crosslinking conditions | Temperature [° C.] | | 160 | 160 | 160 | 160 | 160 |
| | | Time [hour] | | 1 | 1 | 1 | 1 | 1 |

"PVB" and "HDI" are polyvinyl butyral and hexamethylene diamine, respectively. The roughening agent "MX-1500" has an average particle size of 15 μm. "DENKA BUTYRAL" and "DENACOL EX-622" are resin crosslinking agents without having the heterocycric structure and the aromatic ring structure.

TABLE 3

| | | | | Examples | | |
|---|---|---|---|---|---|---|
| | | | | K | L | M |
| Contents [parts by weight] | NBR (AN content 41%) | N220SH | JSR CORPORATION, Japan | 100 | 100 | — |
| | Methoxymethylated nylon | TORESIN EF30T-C | Nagase ChemteX Corporation, Japan | — | — | 100 |
| | Carbon black | DENKA BLACK | DENKI KAGAKU KOGYO KABUSHIKI KAISHA, Japan | 30 | 30 | 20 |
| | Roughening agent | MX-1500 | SOKEN CHEMICALS, CO., LTD., Japan | — | 10 | 10 |
| | Zinc white | | | 5 | 5 | — |
| | Stearic acid | | | 1 | 1 | — |
| | Sulfur | | | 1 | 3 | — |

TABLE 3-continued

| | | Examples | | |
|---|---|---|---|---|
| | | K | L | M |
| Vulcanization accelerator CZ | | 1.5 | 1.5 | — |
| Vulcanization accelerator TT | | 1 | 1 | — |
| Citric acid | | — | — | 2 |
| Crosslinking conditions | Temperature [° C.] | 160 | 160 | 120 |
| | Time [hour] | 1 | 1 | 0.5 |

Initially, there were prepared, in the following manner, intermediate rubber rolls each consisting of a nickel-plated metal core (shaft 12) made of SUS 304 and having an outside diameter of 10 mm, and the low-hardness base layer (14) by using the material for the low-hardness base layer prepared as described above. More specifically described, the low-hardness base layer (14) was formed by molding using a metal mold on an outer circumferential surface of the shaft (12) coated with a suitable conductive adhesive agent. The low-hardness base layer (14) formed on the shaft (12) has a thickness of 5 mm and is constituted by a conductive silicone rubber elastic body. The vulcanization temperature and time period employed for forming the low-hardness base layer (14) were 170° C. and 30 minutes. The thus formed low-hardness base layer (14) has JIS-A hardness of 35° and a volume resistivity of $8\times10^4$ Ω·cm.

After the intermediate rubber rolls were taken out of the respective molds, they were subjected to a coating operation by dipping, using the coating liquids prepared as described above for forming respective coating layers. The coating layers were formed by crosslinking under the respective conditions also indicated in the TABLE 1-3. Thus, there were obtained semi-conductive rolls according to examples A through M. In each of the thus obtained semi-conductive rolls, the coating layer (16) having a thickness of 15 μm was formed integrally on the outer circumferential surface of the intermediate rubber roll described above. Each of the coating layers (16) of the semi-conductive rolls according to Examples A-L has 100% modulus strength of about 5 MPa while the coating layer (16) of the semi-conductive roll according to Example M has 100% modulus strength of 15 MPa. Each of the coating layers (16 ) according to Examples A-M has a volume resistivity of about $1\times10^{10}$ Ω·cm.

Each of the thus obtained semi-conductive rolls according to Examples A-M was evaluated in terms of: (1) crosslinking degree; (2) quality of images reproduced before the roll was subjected to endurance tests; (3) quality of images reproduced after the endurance tests, i.e., after image reproduction on 6000 sheets of paper and after image reproduction on 15000 sheets of paper, wherein the roll was actually installed on an electrophotographic copying machine; (4) presence of wrinkles on the roll surface after the endurance tests; and (5) a change of surface roughness.

(1) Crosslinking Degree

A piece of waste impregnated with methyl ethyl ketone was pressed onto the surface of each of the semi-conductive rolls according to Examples A-L, and the surface of each roll was strongly rubbed with the waste. For the semi-conductive roll according to Example M, a piece of waste impregnated with methanol was used. After rubbing, the waste was observed for evaluating the crosslinking degree according to the following criteria, and the results of evaluation are indicated in the following TABLE 4.

○: Substantially no changes were observed.

X: The surface of the roll was dissolved and the waste was stained with the carbon black adhering thereto.

(2) Quality of Images Reproduced before The Roll Was Subjected to Endurance Tests Each semi-conductive roll was used as a developing roll and installed on a commercially available electophotographic copying machine. Images were reproduced under 20° C.×50% RH. The reproduced images were evaluated according to the following criteria. The results of evaluation are indicated in the TABLE 4.

○: Solid black images had a sufficient degree of density (i.e., not lower than 1.4 in Macbeth density), without suffering from density variation and white dots. Printed characters did not suffer from fading and blur.

X: Solid black images had an insufficient degree of density (i.e., less than 1.4 in Macbeth density), and suffered from density variation and/or white dots.

(3) Quality of Images Reproduced after The Endurance Tests wherein The Roll Was Actually Installed on An Electrophotographic Copying Machine Each semi-conductive roll was used as a developing roll and installed on a commercially available electophotographic copying machine. Images were reproduced under 20° C.×50%RH on 6000 sheets of paper and 15000 sheets of paper. After the 6000-sheet image-reproducing operation and the 15000-sheet image-reproducing operation, reproduced images were evaluated according to the following criteria. The result of evaluation are indicated in the TABLE 4.

○: Solid black images had a sufficient degree of density (i.e., not lower than 1.4 in Macbeth density), without suffering from density variation and white dots. Printed characters did not suffer from fading and blur. Δ: Solid black images suffered from no defects while printed characters suffered from fading or blur.

X: Images suffered from density variation and/or white dots.

(4) Presence of Wrinkles on the Roll Surface after the Endurance Tests

After the 6000-sheet image-reproducing operation and the 15000-sheet image-reproducing operation, the roll surface was observed for checking whether the roll surface suffered from wrinkles. The results of evaluation are indicated in the TABLE 4. (In the TABLE 4, "○" indicates that the roll surface had no wrinkles while "X" indicates that the roll surface suffered from wrinkles.)

(5) A Change of Surface Roughness

After the 6000-sheet image-reproducing operation and the 15000-sheet image-reproducing operation, the surface roughness (Ra) was measured at five different portions of the surface of the roll in the following manner, for checking whether the roll surface was worn and the particles were removed or separated from the surface. The surface roughness (Ra) was measured according to JIS-B 0601 by using a surface roughness meter ("SURFCOM" available from Tokyo Seimitsu Co., Ltd., Japan) under the following conditions: length measured: 4 mm, stylus: 0102508, cutoff: 0.8 mm, feed rate of the stylus: 0.3 mm/s. The average surface roughness Ra was evaluated according to the following criteria and the results of evaluation are indicated in the TABLE 4.

○: The amount of change of the surface roughness Ra before and after each endurance test was less than 0.2 μm.

Δ: The amount of change of the surface roughness Ra before and after each endurance test was less than 0.4 μm.

X: The amount of change of the surface roughness Ra before and after each endurance test was 0.4 μm or greater.

TABLE 4

| | | Examples | | | | | | | | | | | | |
|---|---|---|---|---|---|---|---|---|---|---|---|---|---|---|
| | | A | B | C | D | E | F | G | H | I | J | K | L | M |
| Crosslinking degree | | ○ | ○ | ○ | ○ | ○ | ○ | ○ | ○ | ○ | ○ | X | X | ○ |
| before endurance tests | evaluation of reproduced images | ○ | ○ | ○ | ○ | ○ | ○ | ○ | ○ | ○ | ○ | ○ | ○ | ○ |
| after the endurance test (after image reproduction on 6000 sheets of paper) | evaluation of reproduced images | ○ | ○ | ○ | ○ | ○ | ○ | ○ | ○ | ○ | ○ | X | X | X |
| | presence of wrinkles | ○ | ○ | ○ | ○ | ○ | ○ | ○ | ○ | ○ | ○ | ○ | ○ | X |
| | change of surface roughness | ○ | ○ | ○ | ○ | ○ | ○ | ○ | ○ | ○ | ○ | X | X | ○ |
| after the endurance test (after image reproduction on 15000 sheets of paper) | evaluation of reproduced images | ○ | ○ | ○ | ○ | ○ | ○ | Δ | ○ | ○ | Δ | — | — | — |
| | presence of wrinkles | ○ | ○ | ○ | ○ | ○ | ○ | ○ | ○ | ○ | ○ | — | — | — |
| | change of surface roughness | ○ | ○ | ○ | ○ | ○ | ○ | Δ | ○ | ○ | Δ | — | — | — |

As is apparent from the results indicated in the TABLE 4, in the semi-conductive rolls according to Examples A-J whose coating layers were formed according to the resin crosslinking method, the reproduced images had a high degree of quality after the 6000-sheet image-reproducing operation. Further, those semi-conductive rolls (Examples A-J) exhibited excellent wear resistnace and did not suffer from wrinkles even after the 6000-sheet image-reproducing operation. In particular, the semi-conductive rolls according to Examples A-F, H, and I wherein the resin crosslinking agents having the aromatic ring structure or the heterocyclic structure were used exhibited those excellent characteristics described above even after the 15000-sheet image-reproducing operation.

In contrast, in the semi-conductive rolls according to Examples K and L whose coating layers were formed according to the sulfur vulcanization method, the vulcanization was insufficient, causing undesirable image defects after the 6000-sheet image-reproducing operation. The semi-conductive roll according to Example M whose coating layer was formed of methoxymethylated nylon (methoxymethylated polyamide) suffered from lowered image quality and wrinkles due to the coating layer whose hardness was higher than the base layer.

For confirming the life of each of the coating liquids according to Examples H and L, the concentration values of the solid component (solute) in the respective coating liquids were calculated immediately after preparation, at a timing of two weeks after preparation, and at a timing of one month after preparation. The calculated concentrations are indicted in the following TABLE 5. Each coating liquid was diluted by the solvent as needed, so that the viscosity of the coating liquid was adjusted to about 10 mPa·s. By using the coating liquids H and L, there were produced semi-conductive rolls in a manner similar to that described above at the following three timings: immediately after preparation of the coating liquids; two-week after the preparation; and one-month after the preparation. For each roll, the thickness of the coating layer and the surface roughness (Ra) were measured. The results are also indicated in the following TABLE 5. The experiments were conducted in laboratory (LABO) environment. In general, the roll is manufactured so as to preferably have the surface roughness Ra kept within a range of 1.0±0.2 for assuring a high image quality.

TABLE 5

| | | immediately after preparation | two-week after preparation | one-month after preparation |
|---|---|---|---|---|
| Resin crosslinking [Example H] | Solid component [%] | 15 | 15 | 15 |
| | Thickness [μm] | 15 | 15 | 15 |
| | Surface roughness (Ra) | 1.0 | 1.0 | 1.0 |
| Sulfur vulcanization [Example L] | Solid component [%] | 18 | 11 | *1 |
| | Thickness [μm] | 20 | 13 | *2 |
| | Surface roughness (Ra) | 1.0 | 1.3 | — |

*1: The coating liquid gelled.
*2: The coating layer could not be formed.

As is apparent from the results indicated in the TABLE 5, it is to be understood that the scorching can be prevented in the coating liquid according to Example H which uses the resin crosslinking agent, so that the coating liquid does not suffer from gelation. Accordingly, it is confirmed that the coating layer formed of the coating liquid including the resin crosslinking agent does not suffer from variation in its thickness. Further, the semi-conductive roll whose coating layer is formed of the coating liquid that includes the resin crosslinking agent has the desired surface roughness with considerably high accuracy.

As is apparent from the foregoing description, in the present semi-conductive roll whose coating layer is formed by using the resin crosslinking agent, in place of the conventionally used sulfur crosslinking agent, the crosslinking density of the coating layer is significantly improved, so that the semi-conductive roll advantageously exhibits a wear resistance high enough to withstand a long period of use.

Since the scorching of the rubber material or the elastomer material in the coating liquid does not take place at room temperature owing to the use of the resin crosslinking agent, the coating liquid does not suffer from a change in its viscosity. Therefore, the amount of the rubber material or the elastomer material contained in the coating liquid can be kept constant, permitting easy control of the thickness of the coating layer, whereby the semi-conductive roll advantageously has the desired surface condition with considerably high accuracy.

Since the coating liquid that includes the resin crosslinking agent is free from the scorching and resultant gelation, the semi-conductive roll does not suffer from surface defects due to agglomerates which would be formed by gelation of the coating liquid even if the coating liquid is recycled or reused. Accordingly, the present semi-conductive roll enjoys high economy and high productivity.

What is claimed is:

1. A semi-conductive roll comprising a shaft, a low-hardness base layer formed on an outer circumferential surface of said shaft, and a coating layer formed by coating radially outwardly of said low-hardness base layer, said coating layer comprising one of a rubber material and an elastomer material that is crosslinked by at least one thermosetting resin crosslinking agent having one of an aromatic ring structure and a heterocyclic structure, said at least one thermosetting resin crosslinking agent comprising one of a phenol-formaldehyde resin of a resol type and a xylene-formaldehyde resin of a resol type.

2. The semi-conductive roll according to claim 1, wherein said at least one thermosetting resin crosslinking agent is included in an amount of 1-60 parts by weight per 100 parts by weight of a total amount of said thermosetting resin crosslinking agent and said at least one of said rubber material and said elastomer material.

3. The semi-conductive roll according to claim 1, wherein said at least one thermosetting resin crosslinking agent is included in an amount of 10-50 parts by weight per 100 parts by weight of a total amount of said thermosetting resin crosslinking agent and said at least one of said rubber material and said elastomer material.

4. The semi-conductive roll according to claim 1, wherein said rubber material is an acrylonitrile-butadiene rubber having an acrylonitrile content of at least 30%.

5. The semi-conductive roll according to claim 1, wherein said coating layer has a volume resistivity in a range of $1\times10^{3}-1\times10^{12}$ Ω·cm.

6. The semi-conductive roll according to claim 1, wherein said coating layer has a thickness in a range of 1-200 μm.

7. The semi-conductive roll according to claim 1, wherein said low-hardness base layer comprises a solid elastic body.

8. The semi-conductive roll according to claim 1, wherein said low-hardness base layer comprises a foamed elastic body.

9. The semi-conductive roll according to claim 1, wherein said low-hardness base layer has JJS-A hardness in a range of 5°-50°.

10. The semi-conductive roll according to claim 1, wherein said low-hardness base layer comprises at least one electrically conductive agent such that said low-hardness base layer exhibits electrical conductivity.

* * * * *